(12) United States Patent
Ye et al.

(10) Patent No.: US 9,161,342 B2
(45) Date of Patent: Oct. 13, 2015

(54) METHODS AND APPARATUSES FOR ALLOCATING WIRELESS RESOURCES IN WIRELESS NETWORK

(71) Applicant: Alcatel-Lucent, Paris (FR)

(72) Inventors: Sigen Ye, New Providence, NJ (US); Matthew P J Baker, Canterbury (GB); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 107 days.

(21) Appl. No.: 13/803,794

(22) Filed: Mar. 14, 2013

(65) Prior Publication Data

US 2014/0092820 A1   Apr. 3, 2014

Related U.S. Application Data

(60) Provisional application No. 61/707,481, filed on Sep. 28, 2012.

(51) Int. Cl.
*H04B 7/212* (2006.01)
*H04W 72/04* (2009.01)

(52) U.S. Cl.
CPC ........ *H04W 72/0406* (2013.01); *H04W 72/042* (2013.01)

(58) Field of Classification Search
USPC ................................................ 370/310–349
See application file for complete search history.

(56) References Cited

U.S. PATENT DOCUMENTS

| | | | |
|---|---|---|---|
| 2013/0182664 A1* | 7/2013 | Chen et al. | 370/329 |
| 2013/0194931 A1* | 8/2013 | Lee et al. | 370/241 |
| 2013/0250880 A1* | 9/2013 | Liao et al. | 370/329 |
| 2014/0036810 A1* | 2/2014 | Harrison et al. | 370/329 |
| 2014/0071935 A1* | 3/2014 | Papasakellariou et al. | 370/330 |
| 2014/0078980 A1* | 3/2014 | Frenne et al. | 370/329 |

FOREIGN PATENT DOCUMENTS

EP   2355604 A1   8/2011

OTHER PUBLICATIONS

Frenne, "ePDCCH search space design", U.S. Appl. No. 61/679,140.*
Papasakellariou,"Multiplexing Control Channel Elements for Downlink Control Channels", U.S. Appl. No. 61/697,907.*
Harrison,"Uplink Control Channel Resource Allocation for an Enhanced Sownlink Control Channel", U.S. Appl. No. 61/679,037.*
International Search Report and Written Opinion issued in International Application No. PCT/US2013/061603, dated Dec. 6, 2013.
Motorola Mobility: "Configuration of EPDCCH", Aug. 18, 2012, pp. 1-6.

(Continued)

*Primary Examiner* — Kwang B Yao
*Assistant Examiner* — Juvena Loo
(74) *Attorney, Agent, or Firm* — Harness, Dickey & Pierce, P.L.C.

(57) ABSTRACT

In a method for transmitting control information in a wireless network, a wireless resource allocation module assigns at least one of (i) a first plurality of enhanced resource element groups to a first set of enhanced control channel elements, and (ii) a second plurality of enhanced resource element groups to a second set of enhanced control channel elements; and a transceiver transmits the control information to at least one radio frequency equipment using at least one of the first and second sets of enhanced control channel elements.

19 Claims, 6 Drawing Sheets

(56) References Cited

OTHER PUBLICATIONS

Motorola Mobility: "Further Details on eREG and eCCE", Aug. 5, 2012, pp. 1-3.
CMCC, "eCCE/eREG definition for signaling independent mapping", Aug. 5, 2012, pp. 1-4.
Huawei et al., "PUCCH ACK/NACK resource allocation for ePDCCH", Aug. 5, 2012, pp. 1-5.
Motorola Mobility: "Configuration of EPDCCH", 3GPP, Aug. 18, 2012, pp. 1-6.
CMCC: "eCCE/eREG definition for signaling independent mapping", 3GPP Draft; R1-123738, 3rd Generation Partnership Project (3GPP), 20120813-20120817 Aug. 5, 2012, pp. 1-4.
Huawei et al:"PUCCH ACK/NACK resource allocation for ePDCCH", 3GPP Draft; R1-123122, 3rd Generation Partnership Project (3GPP), 20120813-20120817 Aug. 5, 2012, pp. 1-6.
Taiwanese Office Action and Search Report issued in Taiwan Patent Application No. 102134752, dated Dec. 19, 2014.

* cited by examiner

METHODS AND APPARATUSES FOR ALLOCATING WIRELESS RESOURCES IN WIRELESS NETWORK

CROSS-REFERENCE TO RELATED APPLICATION(S)

This non-provisional U.S. patent application claims priority under 35 U.S.C. §119(e) to provisional U.S. patent application No. 61/707,481, filed on Sep. 28, 2012, the entire contents of which are incorporated herein by reference.

BACKGROUND OF THE INVENTION

Release 11 of Long-Term Evolution (LTE)-Advanced provides a control channel known as the Enhanced Physical Downlink Control Channel (EPDCCH). The EPDCCH is transmitted in one or more physical resource block (PRB) pairs in a subframe. The EPDCCH supports both distributed and localized transmission in the frequency domain.

A basic resource unit known as the Enhanced Resource Element Group (EREG) has been defined for the EPDCCH. The mapping of EREGs to resource elements (REs) is fixed in $3^{rd}$ Generation Partnership Project (3GPP) Long-Term Evolution (LTE) standard specifications. Within each PRB pair, the EREG indices are sequentially mapped to REs, while excluding the REs for demodulation reference signals (24 for normal cyclic prefix (CP) and 12 for extended CP), in a frequency first and then time manner.

Each distributed or localized transmission of control information uses a group of EREGs. Multiple EREGs are sometimes grouped together as Enhanced Control Channel Elements (ECCEs). In this case, each EPDCCH transmission uses one or multiple ECCEs. An ECCE includes N EREGs in both distributed and localized transmissions, where N is equal to 4 or 8. However, the manner in which particular EREGs are grouped together to form ECCEs is undetermined.

An EPDCCH transmission set is defined as a group of P PRB pairs, where P={1 (FFS), 2, 4, 8} for localized transmission, and P={2, 4, 8, 16 (FFS)} for distributed transmission. For PUCCH resource allocation, ECCEs are indexed per EPDCCH transmission set, and the ECCE index is used as one component to determine PUCCH resources. However, ECCE indexing is still an open issue.

SUMMARY OF THE INVENTION

At least one example embodiment provides a method for transmitting control information. According to at least this example embodiment, the method includes: assigning at least one of (i) a first plurality of enhanced resource element groups (EREGs) to a first set of enhanced control channel elements (ECCEs), and (ii) a second plurality of enhanced resource element groups (EREGs) to a second set of enhanced control channel elements (ECCEs); and transmitting the control information to at least one radio frequency equipment using at least one of the first and second sets of enhanced control channel elements. The first plurality of enhanced resource element groups for each first enhanced control channel element have equally spaced indices within a single physical resource block pair (PRB pair) for at least a first control channel (EPDCCH) transmission set. The second plurality of enhanced resource element groups for each second enhanced control channel element are from different physical resource block pairs (PRBs) for at least a second control channel (EPDCCH) transmission set.

At least one example embodiment provides a radio frequency equipment. According to at least this example embodiment, the radio frequency equipment includes: a wireless resource allocation module configured to assign at least one of (i) a first plurality of enhanced resource element groups (EREGs) to a first set of enhanced control channel elements (ECCEs), and (ii) a second plurality of enhanced resource element groups (EREGs) to a second set of enhanced control channel elements (ECCEs); and a transmitter configured to transmit control information to at least one other radio frequency equipment using at least one of the first and second sets of enhanced control channel elements. The first plurality of enhanced resource element groups have equally spaced indices within a single physical resource block pair (PRB pair) for at least a first control channel (EPDCCH) transmission set. At least a first portion of the second plurality of enhanced resource element groups are from different physical resource block pairs (PRBs) for at least a second control channel (EPDCCH) transmission set, and at least a second portion of the second plurality of enhanced resource element groups (EREGs) have different indices.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
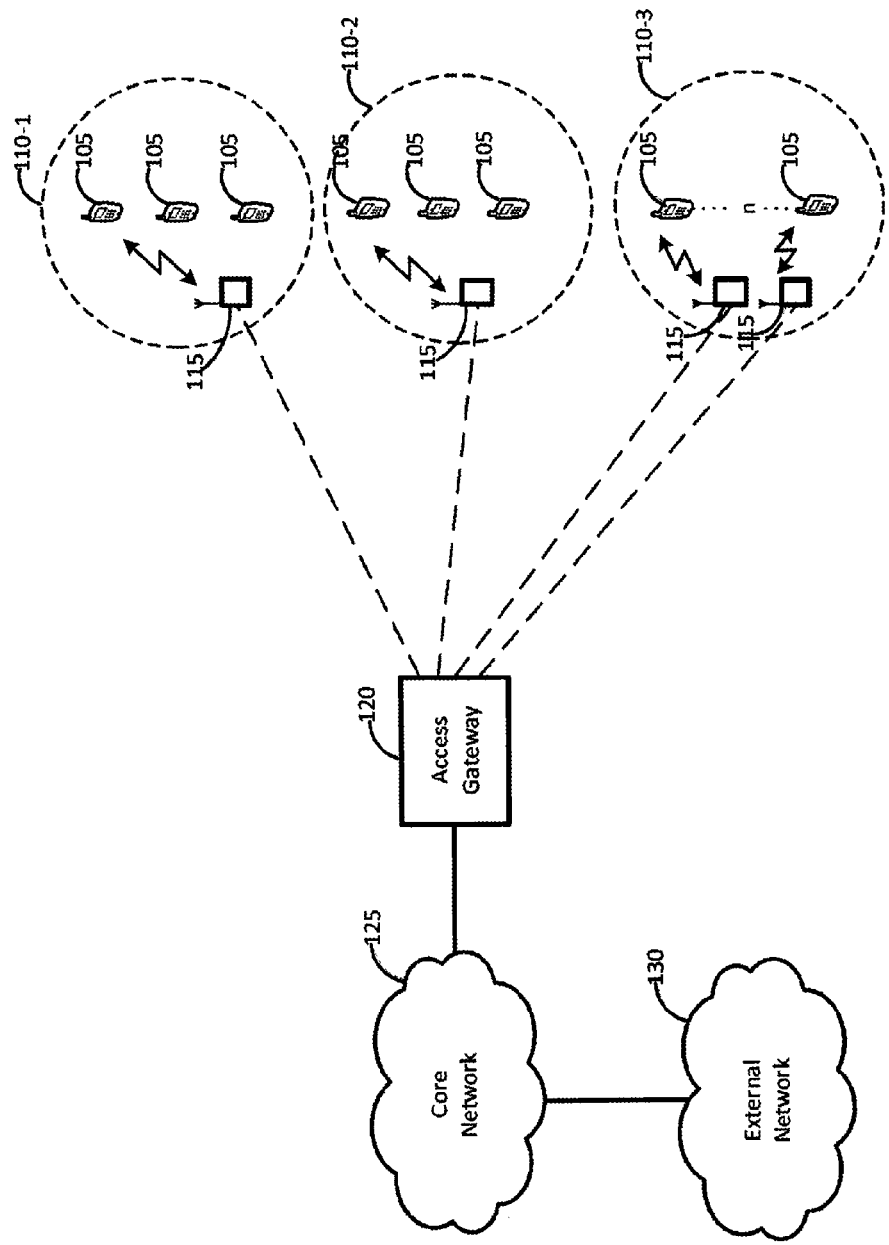
FIG. 1 illustrates an example wireless communication network.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs, eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 illustrates a wireless communication network 100 including an access gateway 120 communicatively coupled to one or more eNodeBs 115. The access gateway 120 is also communicatively coupled to a core network (CN) 125 that is, in turn, communicatively coupled to one or more external networks 130, such as the Internet and/or other circuit and/or packet data networks. Based on this arrangement, the network 100 communicatively couples user equipments (UEs) 105 to each other and/or to other user equipments or systems accessible via the external networks 130.

For example purposes, the wireless network 100 will be described herein as an Evolved Universal Terrestrial Radio Access Network (E-UTRAN). However, it should be understood that example embodiments may also be implemented in conjunction with other networks.

Referring to FIG. 1, the E-UTRAN 100 includes eNodeBs 115, which provide the Evolved Universal Terrestrial Radio Access (E-UTRA) user plane (PDCP/RLC/MAC/PHY) and radio resource control (RRC) plane protocol terminations with user equipments (UEs) 105. The eNodeBs 115 are interconnected with each other by an X2 interface.

As discussed herein, eNodeB 115 refers to a base station that provides radio access to UEs 105 within a given coverage area (e.g., 110-1, 110-2, 110-3). This coverage area is referred to as a cell. However, as is known, multiple cells are often associated with a single eNodeB.

Moreover, as used herein, the term "evolved Node B" or "eNodeB" may be considered synonymous to, and may hereafter be occasionally referred to, as a Node B, base station, base transceiver station (BTS), etc., and describes a transceiver in communication with and providing wireless resources to mobiles in a wireless communication network spanning multiple technology generations. As discussed herein, base stations may have all functionally associated with conventional, well-known base stations in addition to the capability and functionality to perform the methods discussed herein.

The term "user equipment," as discussed herein, may be considered synonymous to, and may hereafter be occasionally referred to, as a client, mobile unit, mobile station, mobile user, mobile, subscriber, user, remote station, access terminal, receiver, etc., and describes a remote user of wireless resources in a wireless communication network.

Collectively, UEs and eNodeBs may be referred to herein as "transceivers" or "radio frequency equipments."

Still referring to FIG. 1, the access gateway 120 is communicatively coupled to the eNodeBs 115. The access gateway 120 includes a logical entity that controls the eNodeBs 115 and coordinates multi-cell scheduling and transmission for eNodeBs 115 belonging to the same Multimedia Broadcast Single Frequency Network (MBSFN) area. For example, as is known, the access gateway 120 controls, inter alia, user radio access network (RAN) mobility management procedures and user session management procedures. More specifically, for example, the access gateway 120 controls a UEs tracking and reachability. The access gateway 120 also controls and executes transmission and/or retransmission of signaling messages, such as paging messages for notifying destination UEs of impending connection requests (e.g., when UEs are being called or when network initiated data intended for the UE is coming).

Figure 2:
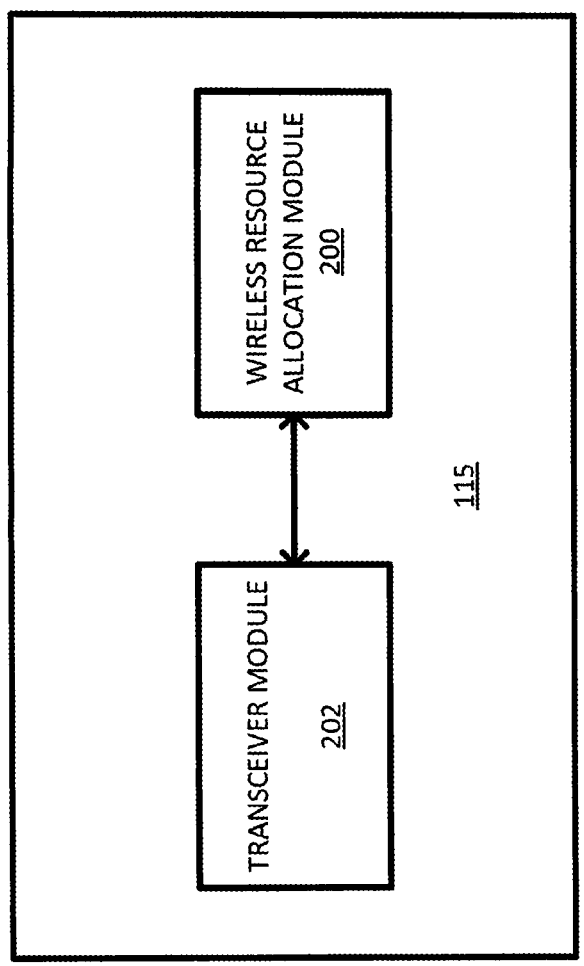
FIG. 2 is a block diagram illustrating a radio frequency equipment according to an example embodiment.

FIG. 2 is a block diagram illustrating an example embodiment of an eNodeB 115 in more detail. Although FIG. 2 illustrates an eNodeB 115, it should be understood that the UEs 105 may also include the components shown in FIG. 2. Moreover, in addition to the components shown in FIG. 2, each of the eNodeB 115 and the UEs 105 include conventional components providing conventional functionality that is well-known in the art.

Referring to FIG. 2, the eNodeB 115 includes a wireless resource allocation module 200 and a transceiver or transceiver module 202. The wireless resource allocation module 200 and the transceiver 202 are communicatively coupled to one another. The functions of the wireless resource allocation module 200 and the transceiver 202 will be discussed in more detail later with regard to FIG. 3. In addition to the functionality discussed herein, each of the wireless resource allocation module 200 and the transceiver 202 are capable of conventional, well-known functionality.

At least some example embodiments will be discussed herein with regard to allocation of wireless resources and transmission of control information (e.g., downlink control information (DCI) messages) on the downlink (from eNodeB to UE). However, it should be understood that example embodiments may also be applicable to the same or similar transmissions on the uplink (e.g., uplink control information from UE to eNodeB).

According to at least one example embodiment, the wireless resource allocation module 202 assigns at least one of (i) a first plurality of Enhanced Resource Element Groups (EREGs) to a first set of Enhanced Control Channel Elements (ECCEs), and (ii) a second plurality of EREGs to a second set of ECCEs. The transceiver module 200 then transmits control information (e.g., DCI messages) to at least one radio frequency equipment (e.g., UE or eNodeB) using at least one of the first and second sets of ECCEs. According to at least this example embodiment, the first plurality of EREGs for each first ECCE have equally spaced indices within a single Physical Resource Block (PRB) pair for at least a first Enhanced Physical Downlink Control Channel (EPDCCH) transmission set (sometimes referred to herein as a control channel transmission set), and the second plurality of EREGs for each second ECCE are from different PRB pairs for at least a second EPDCCH transmission set.

Herein, the assigning of the EREGs to ECCEs may also be referred to as a mapping of EREGs to ECCEs or EREG/ECCE mapping.

Figure 3:
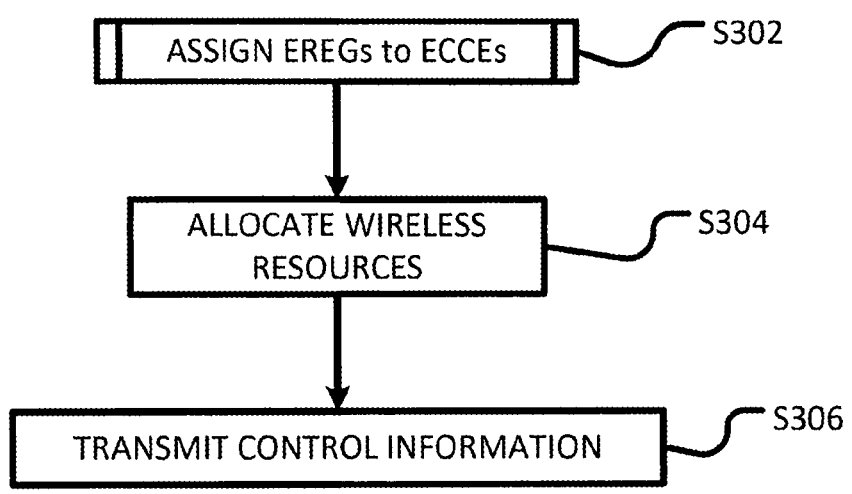
FIG. 3 is a flow chart illustrating a method for transmitting control information according to an example embodiment.

FIG. 3 is a flow chart illustrating an example embodiment of a method for transmitting control information in a wireless network.

Referring to FIG. 3, at step S302 the wireless resource allocation module 200 assigns a set of EREGs to each of a plurality of ECCEs for an EPDCCH transmission set. In one example, the wireless resource allocation module 200 groups or divides the EREGs for a given EPDCCH transmission set into sets of EREGs, and each set of EREGs is associated with an index within the EPDCCH transmission set. Each set of EREGs constitutes an ECCE. In one example, the ECCEs are indexed from 0 to 15 within the EPDCCH transmission set.

The assigning of EREGs to ECCEs for a given EPDCCH transmission set may be performed in a localized or distributed manner. For the sake of this discussion, an ECCE including EREGs assigned in a localized manner is sometimes referred to as a localized ECCE, whereas an ECCE including EREGs assigned in a distributed manner is sometimes referred to as a distributed ECCE.

Each localized ECCE includes EREGs having equally spaced indices within a single PRB pair in an EPDCCH transmission set. For a distributed ECCE, at least a portion of the assigned EREGs are from different PRB pairs and may have the same or different indices. Hence, each localized ECCE includes EREGs that are localized within a PRB pair, whereas each distributed ECCE includes EREGs that are distributed across different PRB pairs.

As discussed herein, N represents the number of EREGs per ECCE, P represents the number of PRB pairs within an EPDCCH transmission set, M1 represents the number of ECCEs per PRB pair, and M represents the number of ECCEs in an EPDCCH transmission set. Each PRB pair has an index p, where p=0, 1, 2, . . . P−1. Each ECCE has an index m, where m=0, 1, 2, . . . M−1. Within each ECCE, EREG has an index n, where n=0, 1, 2, . . . N−1. The EREGs are also indexed from 0 to 15 within each PRB pair, given that there are a total of 16 EREGs per PRB pair.

Figure 4:
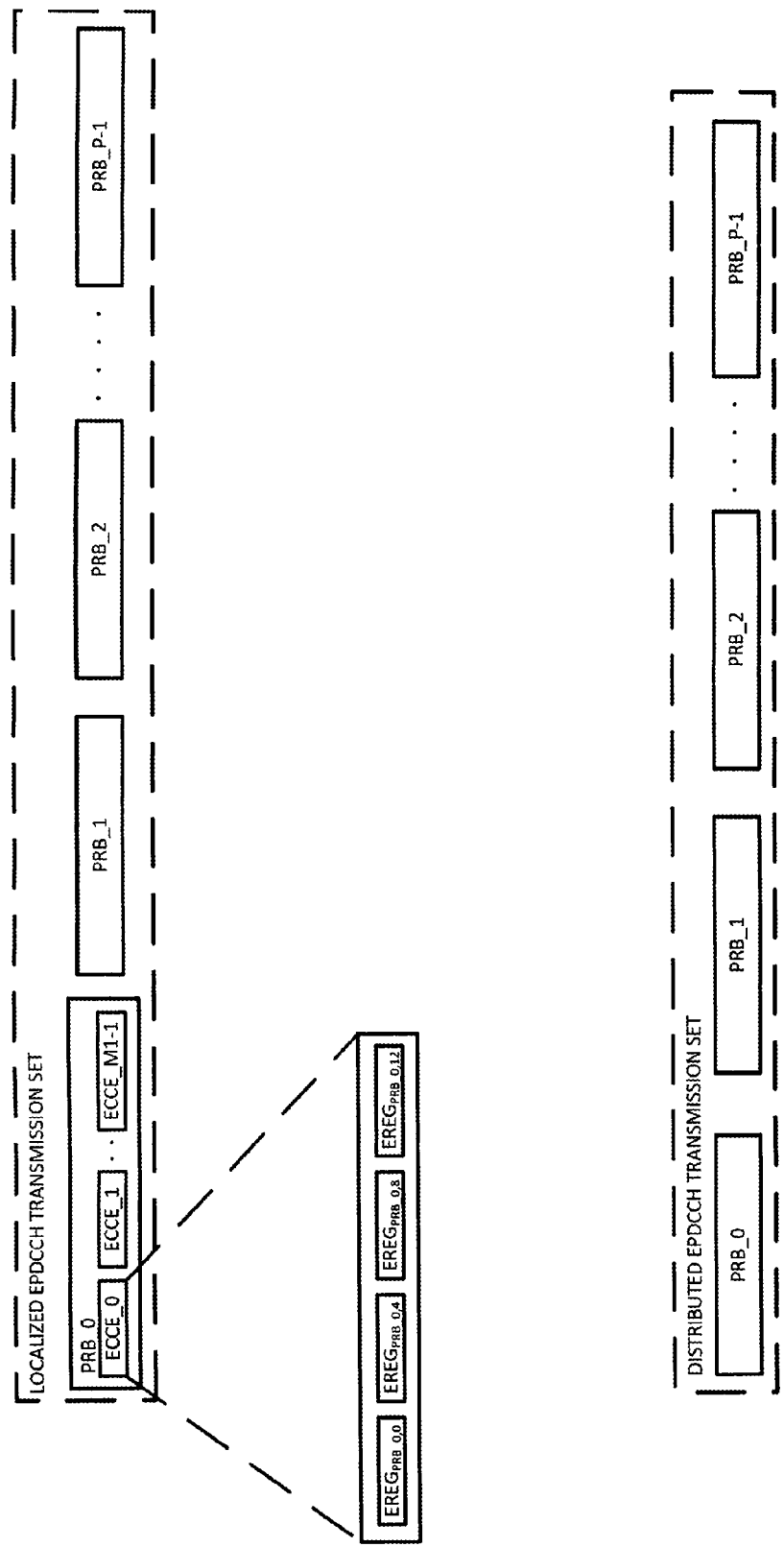
FIG. 4 illustrates example architectures of a localized EPDCCH transmission set and a distributed EPDCCH transmission set.

FIG. 4 illustrates example architectures of a localized EPDCCH transmission set and a distributed EPDCCH transmission set. As mentioned above, an EPDCCH transmission set is defined as a group of P PRB pairs.

Referring to FIG. 4, the localized EPDCCH transmission set includes P number of PRB pairs PRB_0, PRB_1, . . . PRB_P−1, where P=1, 2, 4, or 8. The PRB pair PRB_0 includes M1 number of ECCEs ECCE_0, ECCE_1, . . . ECCE_M/−1, and each ECCE includes N number of EREGs. In the example shown in FIG. 4, the ECCE_0 includes $EREG_{PRB\_0,0}$, $EREG_{PRB\_0,4}$, $EREG_{PRB\_0,8}$, and $EREG_{PRB\_0,12}$ in PRB pair PRB_0. The assignment of the EREGs to the localized ECCE ECCE_0 correspond to that shown in Table 1 below, which is discussed in somewhat more detail later.

Still referring to FIG. 4, the distributed EPDCCH transmission set includes P number of PRB pairs PRB_0, PRB_1, . . . PRB_P−1, where P=2, 4, 8, or 16. Each ECCE includes N number of EREGs, which are distributed across different PRB pairs. In the example distributed EPDCCH transmission set shown in FIG. 4, P may be 4.

For both distributed and localized EPDCCH transmission sets, the number of ECCEs M1 per PRB pair is related to (or based on) the number of EREGs N per ECCE as shown below in Equation (1).

$$M1 = \frac{16}{N} \quad (1)$$

As shown below in Equation (2), the total number of ECCEs M in an EPDCCH transmission set is related to the number of PRB pairs P and the number of EREGs per ECCE. An example of this relationship is given by Equation (2) shown below.

$$M = M1 \times P = \frac{16P}{N} \quad (2)$$

Referring to FIGS. 3 and 4 in combination, for localized EPDCCH transmissions the wireless resource allocation module 200 assigns EREGs having equally spaced indices within the PRB pair PRB_0 to each of the ECCEs ECCE_0, ECCE_1, . . . , ECCE_M1−1 within the PRB pair PRB_0. The wireless resource allocation module 200 indexes the localized ECCEs in order. More generally, the wireless resource allocation module 200 assigns EREGs to each ECCE within the PRB pair PRB_0 based on indices associated with each of the EREGs and a number of PRB pairs within the EPDCCH transmission set. As mentioned above, in the context of localized EPDCCH transmissions, the number of PRB pairs is 1, 2, 4, or 8.

Mathematically, for localized EPDCCH transmissions the wireless resource allocation module 200 assigns EREGs to each ECCE such that the m-th ECCE includes the EREGs having index k=mod(m, M1)+n*M1, for n=0, 1, . . . , N−1, within p-th PRB pair p=floor(m/M/). In other words, the m-th ECCE (m=0, . . . , M−1) within an EPDCCH transmission set includes EREGs having index k, where:

$$k = \mod(m, M1) + n*M1, \text{ for } n=0,1,\ldots,N-1,$$

within the p-th PRB pair p, where p=floor(m/M/).

Referring back to FIG. 4, given the above, the m-th ECCE ECCE_0, where m=0 includes EREGs having indices 0, 4, 8, 12 (e.g., EREG_0, EREG_4, EREG_8, EREG_12 shown in FIG. 4) in PRB pair 0. Further examples of ECCE/EREG mapping are shown below in the "Localized" column of Tables 1 through 3.

For distributed EPDCCH transmissions, the wireless resource allocation module 200 assigns or maps EREGs to each distributed ECCE using one of two distributed algorithms.

In a first of the distributed algorithms, if the number of PRB pairs is greater than or equal to the number of EREGs per ECCE (i.e., P≥1V), then the wireless resource allocation module 200 groups the EREGs such that each distributed ECCE includes EREGs having a same index k from different PRB pairs.

If the number of PRB pairs is less than the number of EREGs per ECCE (i.e., P<1V), then the wireless resource allocation module 200 groups EREGs such that each distributed ECCE includes some EREGs having a same index k from different PRB pairs and some EREGs having a different index k from different PRB pairs.

Mathematically, the first algorithm can be expressed as shown below.

If P≥N, then the m-th distributed ECCE (for m= 0, 1, 2, . . . , M−1) includes EREGs having index k in the PRB pair p, where $$p = \mod\left(\text{floor}\left(\frac{m}{M1}\right), \frac{P}{N}\right) + n\frac{P}{N},$$

and $$k = \mod\left(\mod(m, M1) + \text{floor}\left(\frac{\left(\frac{m}{M1}\right)}{\frac{P}{N}}\right) * M1, 16\right);$$

and

If P<N, the m-th distributed ECCE (m=0, 1, 2, . . . , M−1) includes the EREGs having index k in the PRB pair p, where $$p = \mod(n, P),$$

and $$k = \mod\left(\mod(m, M1) + \text{floor}\left(\frac{m}{M1}\right) * M1 + \text{floor}\left(\frac{n}{P}\right) * \frac{16}{\frac{N}{P}}, 16\right).$$

In a more specific example, if the number of PRB pairs P is 4 and the number of EREGs per ECCE N is 4 (i.e., P=1V), then ECCE_0 includes EREGs having index 0 from each of PRB pairs PRB_0, PRB_1, PRB_2 and PRB_3.

Figure 5:
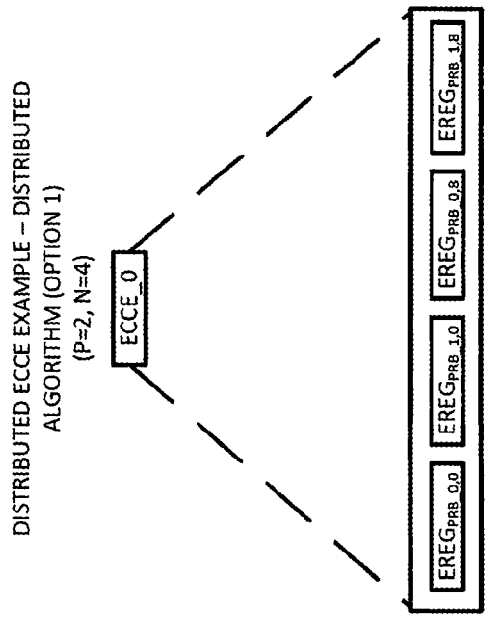
FIG. 5 shows example structures of a distributed ECCE when the number of PRB pairs is equal to the number of EREGs per ECCE, and a distributed ECCE when the number of PRB pairs is less than the number of EREGS per ECCE.
Figure 5:
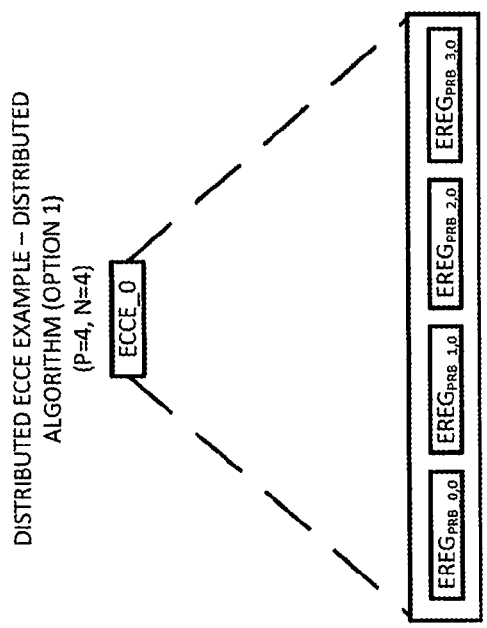

FIG. 5 shows an example structure of a distributed ECCE ECCE_0 when the number of PRB pairs P is 4 and the number of EREGs per ECCE N is 4. As shown, the distributed ECCE ECCE_0 includes EREGs having index 0 from each of PRB pairs PRB_0, PRB_1, PRB_2 and PRB_3. In this regard, $EREG_{PRB\_0,0}$ refers to the EREG having index 0 from PRB pair PRB_0, $EREG_{PRB\_1,0}$ refers to the EREG having index 0 from PRB pair PRB_1, $EREG_{PRB\_2,0}$ refers to the EREG having index 0 from PRB pair PRB_2, and $EREG_{PRB\_3,0}$ refers to the EREG having index 0 from PRB pair PRB_3.

If the number of PRB pairs P is 2 and the number of EREGs per ECCE N is 4 (i.e., P<1V), then ECCE_0 includes EREGs having index 0 and 8 from each of PRB pairs PRB_0 and PRB_1.

FIG. 5 also shows an example structure of distributed ECCE ECCE_0 when the number of PRB pairs P is 2 and the number of EREGs per ECCE N is 4. As shown, the distributed ECCE ECCE_0 includes EREGs $EREG_{PRB\_0,0}$ and $EREG_{PRB\_1,0}$ as discussed above, but further includes EREG $EREG_{PRB\_0,8}$ and $EREG_{PRB\_1,8}$. The EREG $EREG_{PRB\_0,8}$ refers to the EREG having index 8 from PRB pair PRB_0, and the EREG $EREG_{PRB\_1,8}$ refers to the EREG having index 8 from PRB pair PRB_1.

Further examples of ECCE/EREG mapping are shown below in the "Distributed—Option 1" column of Tables 1 through 3.

In a second distributed algorithm, the wireless resource allocation module 200 groups the EREGs such that each distributed ECCE includes EREGs with different indices k from the same or different PRB pairs.

In this example, if the number of PRB pairs P is greater than or equal to the number of EREGs per ECCE N (i.e., P 1V), then the wireless resource allocation module 200 assigns EREGs to the ECCEs such that the m-th distributed ECCE (for m=0, ..., M−1) includes EREGs having index k in the PRB pair p, where $$p = \mod\left(\text{floor}\left(\frac{m}{M1}\right), \frac{P}{N}\right) + n\frac{P}{N}$$

and $$k = \mod\left(\mod(m, M1) + \left(n + \text{floor}\left(\frac{m/M1}{P/N}\right)\right) * M1, 16\right).$$

If the number of PRB pairs P is less than the number of EREGs N per ECCE (i.e., P<1V), then the wireless resource allocation module 200 assigns EREGs to the ECCEs such that the m-th distributed ECCE (for m=0, ..., M−1) includes EREGs having index k in the PRB pair p, $$p = \mod(n, P)$$

and $$k = \mod\left(\mod(m, M1) + \left(n + \text{floor}\left(\frac{m}{M1}\right)\right) * M1, 16\right).$$

In one example, if the number of PRB pairs P is 4 and the number of EREGs N is 4 (i.e., P=1V), then ECCE_0 includes EREG_0 from PRB_0, EREG_4 from PRB_1, EREG_8 from PRB_2 and EREG_12 from PRB_3.

Figure 6:
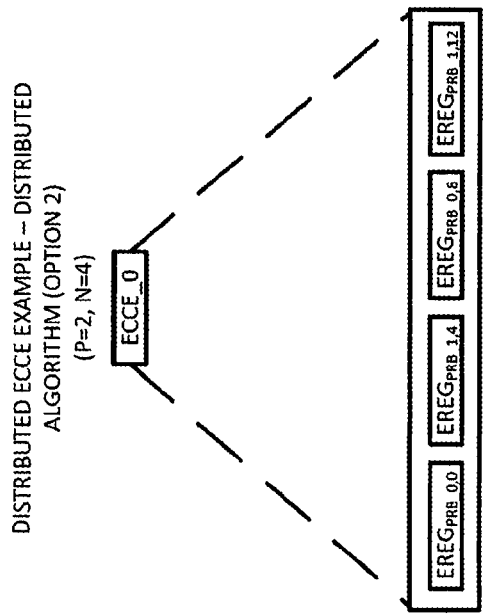
FIG. 6 shows other example structures of a distributed ECCE when the number of PRB pairs is equal to the number of number of EREGs per ECCE, and a distributed ECCE when the number of PRB pairs is less than the number of EREGs per ECCE.
Figure 6:
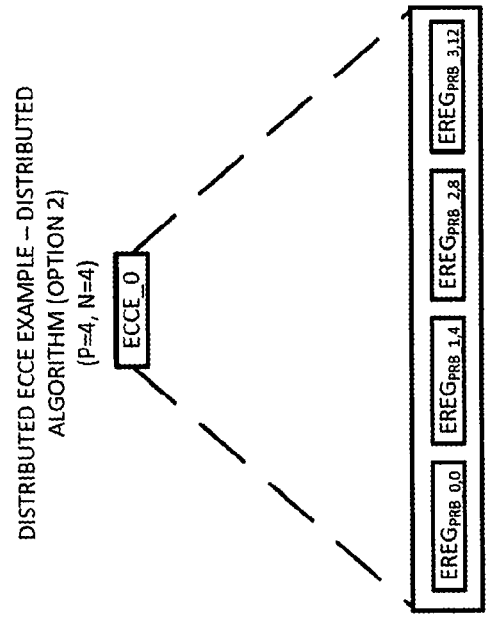

FIG. 6 shows an example structure of a distributed ECCE ECCE_0 when the number of PRB pairs P is 4 and the number of number of EREGs per ECCE N is 4. As shown, the distributed ECCE ECCE_0 includes $EREG_{PRB\_0,0}$, $EREG_{PRB\_1,4}$, $EREG_{PRB\_2,8}$, and $EREG_{PRB\_3,12}$. The $EREG_{PRB\_1,4}$ refers to the EREG having index 4 from PRB pair PRB_1, $EREG_{PRB\_2,8}$ refers to the EREG having index 8 from PRB pair PRB_2, and $EREG_{PRB\_3,12}$ refers to the EREG having index 12 from PRB pair PRB_3.

If the number of PRB pairs P is 2 and the number of EREGs N is 4 (i.e., P<1V), then ECCE_0 includes EREG_0 from PRB_0, EREG_4 from PRB_1, EREG_8 from PRB_0 and EREG_12 from PRB_1.

FIG. 6 also shows an example structure of a distributed ECCE ECCE_0 when the number of PRB pairs P is 2 and the number of EREGs per ECCE N is 4. As shown, the distributed ECCE ECCE_0 includes EREGs $EREG_{PRB\_0,0}$, $EREG_{PRB\_1,4}$, and $EREG_{PRB\_0,8}$ as discussed above, but further includes $EREG_{PRB\_1,12}$. The EREG $EREG_{PRB\_1,12}$ refers to the EREG having index 12 from PRB pair PRB_1.

Further examples of ECCE/EREG mapping are shown below in the "Distributed—Option 2" column of Tables 1 through 3.

Table 1 shows an example ECCE/EREG mapping and ECCE indexing when the number of PRB pairs P is 4 (P=4) and the number of EREGs per ECCE N is 4 (N=4).

TABLE 1

Example of ECCE/EREG mapping for P = 4 and N = 4

PRB pair index/EREG index (p/n) within the PRB pair

| ECCE index | Localized | Distributed Algorithm (Option) 1 | Distributed Algorithm (Option) 2 |
|---|---|---|---|
| 0 | 0/0, 0/4, 0/8, 0/12 | 0/0, 1/0, 2/0, 3/0 | 0/0, 1/4, 2/8, 3/12 |
| 1 | 0/1, 0/5, 0/9, 0/13 | 0/1, 1/1, 2/1, 3/1 | 0/1, 1/5, 2/9, 3/13 |
| 2 | 0/2, 0/6, 0/10, 0/14 | 0/2, 1/2, 2/2, 3/2 | 0/2, 1/6, 2/10, 3/14 |
| 3 | 0/3, 0/7, 0/11, 0/15 | 0/3, 1/3, 2/3, 3/3 | 0/3, 1/7, 2/11, 3/15 |
| 4 | 1/0, 1/4, 1/8, 1/12 | 0/4, 1/4, 2/4, 3/4 | 0/4, 1/8, 2/12, 3/0 |
| 5 | 1/1, 1/5, 1/9, 1/13 | 0/5, 1/5, 2/5, 3/5 | 0/5, 1/9, 2/13, 3/1 |
| 6 | 1/2, 1/6, 1/10, 1/14 | 0/6, 1/6, 2/6, 3/6 | 0/6, 1/10, 2/14, 3/2 |
| 7 | 1/3, 1/7, 1/11, 1/15 | 0/7, 1/7, 2/7, 3/7 | 0/7, 1/11, 2/15, 3/3 |
| 8 | 2/0, 2/4, 2/8, 2/12 | 0/8, 1/8, 2/8, 3/8 | 0/8, 1/12, 2/0, 3/4 |
| 9 | 2/1, 2/5, 2/9, 2/13 | 0/9, 1/9, 2/9, 3/9 | 0/9, 1/13, 2/1, 3/5 |
| 10 | 2/2, 2/6, 2/10, 2/14 | 0/10, 1/10, 2/10, 3/10 | 0/10, 1/14, 2/2, 3/6 |
| 11 | 2/3, 2/7, 2/11, 2/15 | 0/11, 1/11, 2/11, 3/11 | 0/11, 1/15, 2/3, 3/7 |
| 12 | 3/0, 3/4, 3/8, 3/12 | 0/12, 1/12, 2/12, 3/12 | 0/12, 1/0, 2/4, 3/8 |
| 13 | 3/1, 3/5, 3/9, 3/13 | 0/13, 1/13, 2/13, 3/13 | 0/13, 1/1, 2/5, 3/9 |
| 14 | 3/2, 3/6, 3/10, 3/14 | 0/14, 1/14, 2/14, 3/14 | 0/14, 1/2, 2/6, 3/10 |
| 15 | 3/3, 3/7, 3/11, 3/15 | 0/15, 1/15, 2/15, 3/15 | 0/15, 1/3, 2/7, 3/11 |

Table 2 shows an example ECCE/EREG mapping and ECCE indexing when the number of PRB pairs P is 8 (P=8) and the number of EREGs per ECCE N is 4 (N=4), according to an example embodiment.

TABLE 2

Example of ECCE/EREG mapping for P = 8 and N = 4

PRB pair index/EREG index (p/n) within the PRB pair

| ECCE index | Localized | Distributed Algorithm (Option) 1 | Distributed Algorithm (Option) 2 |
|---|---|---|---|
| 0 | 0/0, 0/4, 0/8, 0/12 | 0/0, 2/0, 4/0, 6/0 | 0/0, 2/4, 4/8, 6/12 |
| 1 | 0/1, 0/5, 0/9, 0/13 | 0/1, 2/1, 4/1, 6/1 | 0/1, 2/5, 4/9, 6/13 |
| 2 | 0/2, 0/6, 0/10, 0/14 | 0/2, 2/2, 4/2, 6/2 | 0/2, 2/6, 4/10, 6/14 |
| 3 | 0/3, 0/7, 0/11, 0/15 | 0/3, 2/3, 4/3, 6/3 | 0/3, 2/7, 4/11, 6/15 |
| 4 | 1/0, 1/4, 1/8, 1/12 | 1/0, 3/0, 5/0, 7/0 | 1/0, 3/4, 5/8, 7/12 |
| 5 | 1/1, 1/5, 1/9, 1/13 | 1/1, 3/1, 5/1, 7/1 | 1/1, 3/5, 5/9, 7/13 |
| 6 | 1/2, 1/6, 1/10, 1/14 | 1/2, 3/2, 5/2, 7/2 | 1/2, 3/6, 5/10, 7/14 |
| 7 | 1/3, 1/7, 1/11, 1/15 | 1/3, 3/3, 5/3, 7/3 | 1/3, 3/7, 5/11, 7/15 |
| 8 | 2/0, 2/4, 2/8, 2/12 | 0/4, 2/4, 4/4, 6/4 | 0/4, 2/8, 4/12, 6/0 |
| 9 | 2/1, 2/5, 2/9, 2/13 | 0/5, 2/5, 4/5, 6/5 | 0/5, 2/9, 4/13, 6/1 |
| 10 | 2/2, 2/6, 2/10, 2/14 | 0/6, 2/6, 4/6, 6/6 | 0/6, 2/10, 4/14, 6/2 |
| 11 | 2/3, 2/7, 2/11, 2/15 | 0/7, 2/7, 4/7, 6/7 | 0/7, 2/11, 4/15, 6/3 |
| 12 | 3/0, 3/4, 3/8, 3/12 | 1/4, 3/4, 5/4, 7/4 | 1/4, 3/8, 5/12, 7/0 |
| 13 | 3/1, 3/5, 3/9, 3/13 | 1/5, 3/5, 5/5, 7/5 | 1/5, 3/9, 5,13, 7/1 |
| 14 | 3/2, 3/6, 3/10, 3/14 | 1/6, 3/6, 5/6, 7/6 | 1/6, 3/10, 5/14, 7/2 |
| 15 | 3/3, 3/7, 3/11, 3/15 | 1/7, 3/7, 5/7, 7/7 | 1/7, 3/11, 5/15, 7/3 |
| 16 | 4/0, 4/4, 4/8, 4/12 | 0/8, 2/8, 4/8, 6/8 | 0/8, 2/12, 4/0, 6/4 |
| 17 | 4/1, 4/5, 4/9, 4/13 | 0/9, 2/9, 4/9, 6/9 | 0/9, 2/13, 4/1, 6/5 |
| 18 | 4/2, 4/6, 4/10, 4/14 | 0/10, 2/10, 4/10, 6/10 | 0/10, 2/14, 4/2, 6/6 |
| 19 | 4/3, 4/7, 4/11, 4/15 | 0/11, 2/11, 4/11, 6/11 | 0/11, 2/15, 4/3, 6/7 |
| 20 | 5/0, 5/4, 5/8, 5/12 | 1/8, 3/8, 5/8, 7/8 | 1/8, 3/12, 5/0, 7/4 |
| 21 | 5/1, 5/5, 5/9, 5/13 | 1/9, 3/9, 5/9, 7/9 | 1/9, 3/13, 5/1, 7/5 |
| 22 | 5/2, 5/6, 5/10, 5/14 | 1/10, 3/10, 5/10, 7/10 | 1/10, 3/14, 5/2, 7/6 |
| 23 | 5/3, 5/7, 5/11, 5/15 | 1/11, 3/11, 5/11, 7/11 | 1/11, 3/15, 5/3, 7/7 |
| 24 | 6/0, 6/4, 6/8, 6/12 | 0/12, 2/12, 4/12, 6/12 | 0/12, 2/0, 4/4, 6/8 |
| 25 | 6/1, 6/5, 6/9, 6/13 | 0/13, 2/13, 4/13, 6/13 | 0/13, 2/1, 4/5, 6/9 |
| 26 | 6/2, 6/6, 6/10, 6/14 | 0/14, 2/14, 4/14, 6/14 | 0/14, 2/2, 4/6, 6/10 |
| 27 | 6/3, 6/7, 6/11, 6/15 | 0/15, 2/15, 4/15, 6/15 | 0/15, 2/3, 4/7, 6/11 |
| 28 | 7/0, 7/4, 7/8, 7/12 | 1/12, 3/12, 5/12, 7/12 | 1/12, 3/0, 5/4, 7/8 |
| 29 | 7/1, 7/5, 7/9, 7/13 | 1/13, 3/13, 5/13, 7/13 | 1/13, 3/1, 5/5, 7/9 |
| 30 | 7/2, 7/6, 7/10, 7/14 | 1/14, 3/14, 5/14, 7/14 | 1/14, 3/2, 5/6, 7/10 |
| 31 | 7/3, 7/7, 7/11, 7/15 | 1/15, 3/15, 5/15, 7/15 | 1/15, 3/3, 5/7, 7/11 |

Table 3 shows an example ECCE/EREG mapping and ECCE indexing when the number of PRB pairs P is 2 (P=2) and the number of EREGs per ECCE N is 4 (N=4), according to an example embodiment.

TABLE 3

Example of ECCE/EREG mapping for P = 2 and N = 4

| ECCE index | PRB pair index/EREG index (p/n) within the PRB pair | | |
|---|---|---|---|
| | Localized | Distributed Algorithm (Option) 1 | Distributed Algorithm (Option) 2 |
| 0 | 0/0, 0/4, 0/8, 0/12 | 0/0, 1/0, 0/8, 1/8 | 0/0, 1/4, 0/8, 1/12 |
| 1 | 0/1, 0/5, 0/9, 0/13 | 0/1, 1/1, 0/9, 1/9 | 0/1, 1/5, 0/9, 1/13 |
| 2 | 0/2, 0/6, 0/10, 0/14 | 0/2, 1/2, 0/10, 1/10 | 0/2, 1/6, 0/10, 1/14 |
| 3 | 0/3, 0/7, 0/11, 0/15 | 0/3, 1/3, 0/11, 1/11 | 0/3, 1/7, 0/11, 1/15 |
| 4 | 1/0, 1/4, 1/8, 1/12 | 0/4, 1/4, 0/12, 1/12 | 0/4, 1/8, 0/12, 1/0 |
| 5 | 1/1, 1/5, 1/9, 1/13 | 0/5, 1/5, 0/13, 1/13 | 0/5, 1/9, 0/13, 1/1 |
| 6 | 1/2, 1/6, 1/10, 1/14 | 0/6, 1/6, 0/14, 1/14 | 0/6, 1/10, 0/14, 1/2 |
| 7 | 1/3, 1/7, 1/11, 1/15 | 0/7, 1/7, 0/15, 1/15 | 0/7, 1/11, 0/15, 1/3 |

Returning to FIG. 3, at step S304 the wireless resource allocation module 200 allocates wireless resources to one or more radio frequency equipments in the wireless network. In one example, the wireless resource allocation module 200 allocates wireless resources to the one or more radio frequency equipments using the ECCEs discussed above with regard to step S302. The allocation of wireless resources by the wireless resource allocation module 200 may be done in any well-known manner. Therefore, a detailed discussion is omitted for the sake of brevity.

At S306, the transceiver 202 transmits control information (e.g., DCI messages) to the one or more radio frequency equipments (e.g., eNodeB and/or UE) in the wireless network using the ECCEs allocated to the one or more radio frequency equipments.

According to example embodiments, distributed and localized ECCEs are indexed such that the ECCE indices do not conflict with each other when the distributed transmission set and localized transmission set share the same PRB pairs. In this regard, the distributed or localized ECCEs are indexed uniquely within each EPDCCH transmission set. And, a distributed ECCE and a localized ECCE that have the same index share at least one EREG. Note that one EREG can only be used for either distributed transmission or localized transmission, not for both simultaneously. Therefore, if the distributed ECCE with index i is used for distributed transmission, the localized ECCE with index i is not available for localized transmission. This allows the ECCE index to be used directly for the PUCCH resource determination, without potential conflict between distributed and localized ECCEs.

The following example is provided to better explain the meaning of no conflict between ECCE indices for distributed and localized ECCEs. For this example, localized ECCE indexing and distributed ECCE indexing according to the second algorithm is used by the wireless resource allocation module 200. Moreover, the number of PRB pairs P is 4 (P=4) and the number of EREGs per ECCE N is 4 (N=4).

Assuming distributed ECCE_0 is used for distributed transmission of control information to a radio frequency equipment (e.g., eNodeB, UE, etc.), then ECCE_0 includes EREG_0 from PRB_0, EREG_4 from PRB_1, EREG_8 from PRB_2 and EREG_12 from PRB_3. In this example, localized ECCEs ECCE_0, ECCE_4, ECCE_8, and ECCE_12 cannot be used for localized transmissions of control information to any radio frequency equipment within the EPDCCH set because a portion of these ECCEs are already used by the distributed transmission. The localized ECCEs that are available to be used include ECCE_1, ECCE_2, ECCE_3, ECCE_5, ECCE_6, ECCE_7, ECCE_9, ECCE_10, ECCE_11, ECCE_13, ECCE_14 and ECCE_15, and none of these ECCEs have the same index with the distributed ECCE (i.e. index 0). Therefore, no index conflict exists between distributed and localized transmissions.

Example embodiments provide a more systematic and unified approach for grouping EREGs into similar size groups or units, and indexing these groups of EREGs for an EPDCCH transmission set. The indexing scheme suppresses and/or avoids conflict between distributed and localized transmission, and may be directly used for PUCCH resource allocation.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for transmitting control information in a wireless network, the method comprising:
   assigning a first plurality of enhanced resource element groups to a first set of enhanced control channel elements; and
   transmitting the control information to at least one radio frequency equipment using the first set of enhanced control channel elements; wherein
   the first plurality of enhanced resource element groups for each first enhanced control channel element in the first set of enhanced control channel elements have equally spaced indices within a single physical resource block pair for at least a first control channel transmission set, and
   the first plurality of enhanced resource element groups are assigned to each first enhanced control channel element such that an m-th enhanced control channel element within the first control channel transmission set includes, from among the first plurality of enhanced resource element groups, enhanced resource element groups having index k,
   where k=mod(m,M1)+n*M1, for n=0, 1, . . . , N−1, within a p-th physical resource block pair p,
   p=floor(m/M1),
   m=0, . . . , M−1,
   M=M1×P,
   M1=16/N,
   N is a number of enhanced resource element groups assigned to each first enhanced control channel element in the first set of enhanced control channel elements, and
   the first control channel transmission set includes 16 enhanced control channel elements.

2. The method of claim 1, wherein the first control channel transmission set and a second control channel transmission set have one of a same and different set of physical resource block pairs.

3. The method of claim 1, wherein the first enhanced control channel elements in the first set of enhanced control channel elements are indexed sequentially in the physical resource block pair within the first control channel transmission set.

4. The method of claim 1, further comprising:
assigning a second plurality of enhanced resource element groups to a second set of enhanced control channel elements; and
transmitting the control information to at least one radio frequency equipment using the second set of enhanced control channel elements;
wherein the second plurality of enhanced resource element groups for each second enhanced control channel element in the second set of enhanced control channel elements are from multiple physical resource block pairs for at least a second control channel transmission set; and
wherein the second enhanced control channel elements in the second set of enhanced control channel elements are indexed uniquely within the second control channel transmission set.

5. The method of claim 4, wherein
the first control channel transmission set and the second control channel transmission set have the same set of physical resource block pairs, and
at least a first enhanced control channel element from the first set of enhanced control channel elements and a second enhanced control channel element from the second set of enhanced control channel elements have the same index and share at least one enhanced resource element group.

6. The method of claim 4, wherein if a number of physical resource block pairs in the second control channel transmission set is greater than or equal to a number of enhanced resource element groups per second enhanced control channel element within the second control channel transmission set, then each second enhanced control channel element includes enhanced resource element groups from different physical resource block pairs.

7. The method of claim 4, wherein each second enhanced control channel element includes enhanced resource element groups having the same index.

8. The method of claim 4, wherein each second enhanced control channel element includes enhanced resource element groups having different indices.

9. The method of claim 1, wherein an index of a first enhanced control channel element is used to implicitly determine a resource for acknowledgement feedback.

10. The method of claim 4, wherein if a number of physical resource block pairs in the second control channel transmission set is less than a number of enhanced resource element groups per second enhanced control channel element within the second control channel transmission set, then a portion of the enhanced resource element groups assigned to each second enhanced control channel element have different indices and are from different physical resource block pairs.

11. A radio frequency equipment comprising:
a wireless resource allocation module configured to assign a first plurality of enhanced resource element groups to a first set of enhanced control channel elements; and
a transmitter configured to transmit control information to at least one other radio frequency equipment using the first set of enhanced control channel elements; wherein
the first plurality of enhanced resource element groups for each first enhanced control channel element in the first set of enhanced control channel elements have equally spaced indices within a single physical resource block pair for at least a first control channel transmission set, and
the first plurality of enhanced resource element groups are assigned to each first enhanced control channel element such that an m-th enhanced control channel element within the first control channel transmission set includes, from among the first plurality of enhanced resource element groups, enhanced resource element groups, having index k,
where k=mod(m, M1)+n*M1, for n=0, 1, . . . , N−1, within a p-th physical resource block pair p,
p=floor(m/M1),
m=0, . . . , M−1,
M=M1×P,
M1=16/N,
N is a number of enhanced resource element groups assigned to each first enhanced control channel element in the first set of enhanced control channel elements, and
the first control channel transmission set includes 16 enhanced control channel elements.

12. The radio frequency equipment of claim 11, wherein the first control channel transmission set and a second control channel transmission set have one of a same and different set of physical resource block pairs.

13. The radio frequency equipment of claim 11, wherein the first enhanced control channel elements in the first set of enhanced control channel elements are indexed sequentially in the physical resource block pair within the first control channel transmission set.

14. The radio frequency equipment of claim 11, wherein
the wireless resource allocation module is further configured to assign a second plurality of enhanced resource element groups to a second set of enhanced control channel elements;
the transmitter is further configured to transmit the control information to at least one radio frequency equipment using the second set of enhanced control channel elements;
the second plurality of enhanced resource element groups for each second enhanced control channel element in the second set of enhanced control channel elements are from multiple physical resource block pairs for at least a second control channel transmission set; and
the enhanced control channel elements in the second set of enhanced control channel elements are indexed uniquely within the second control channel transmission set.

15. The radio frequency equipment of claim 14, wherein
the first control channel transmission set and the second control channel transmission set have the same set of physical resource block pairs; and
at least a first enhanced control channel element from the first set of enhanced control channel elements and a second enhanced control channel element from the second set of enhanced control channel elements have the same index and share at least one enhanced resource element group.

16. The radio frequency equipment of claim 14, wherein if a number of physical resource block pairs in the second control channel transmission set is greater than or equal to a number of enhanced resource element groups per second enhanced control channel element within the second control channel transmission set, then each second enhanced control channel element includes enhanced resource element groups from different physical resource block pairs.

17. The radio frequency equipment of claim 14, wherein each second enhanced control channel element includes enhanced resource element groups having the same index.

18. The radio frequency equipment of claim 14, wherein each second enhanced control channel element includes enhanced resource element groups having different indices.

19. The radio frequency equipment of claim 14, wherein if a number of physical resource block pairs in the second control channel transmission set is less than a number of enhanced resource element groups per second enhanced control channel element within the second control channel transmission set, then a portion of the enhanced resource element groups assigned to each second enhanced control channel element have different indices and are from different physical resource block pairs.

* * * * *